United States Patent [19]

Cepkauskas

[11] Patent Number: 5,297,182
[45] Date of Patent: Mar. 22, 1994

[54] METHOD OF DECOMMISSIONING A NUCLEAR REACTOR

[75] Inventor: Martin D. Cepkauskas, Eastham, Mass.

[73] Assignee: M-K Ferguson Company, Cleveland, Ohio

[21] Appl. No.: 784,548

[22] Filed: Oct. 29, 1991

[51] Int. Cl.$^5$ .................................... G21C 19/00
[52] U.S. Cl. .................................... 376/260
[58] Field of Search ........... 976/DIG. 292, DIG. 293; 376/260

[56] References Cited

U.S. PATENT DOCUMENTS

| | | | |
|---|---|---|---|
| 4,299,658 | 11/1981 | Meuschke et al. | 376/260 |
| 4,483,790 | 11/1984 | Gaiser | 376/272 |
| 4,594,774 | 6/1986 | Barker et al. | 376/260 |
| 4,648,989 | 3/1987 | Klein | 376/261 |
| 4,666,659 | 5/1987 | Lusk et al. | 376/272 |
| 4,994,230 | 2/1991 | Cepkauskas | 376/260 |
| 5,001,870 | 3/1991 | Yokota et al. | 51/410 |

OTHER PUBLICATIONS

"When a nuclear reactor dies, $98 million is a cheap funeral", by Seth Shulman, Smithsonian magazine, Oct./Nov. 1989, pp. 54–64 67–69.

Trentec Diamond Wire Concrete Cutting, brochure, Jan. 1991.

Primary Examiner—Donald P. Walsh
Assistant Examiner—Frederick H. Voss
Attorney, Agent, or Firm—Calfee, Halter & Griswold

[57] ABSTRACT

A method of decommissioning a nuclear reactor is provided in which radiation exposure is minimized. The method includes the steps of encapsulating portions of the reactor vessel and reactor internals into a solid reactor capsule and then converting this reactor capsule into a plurality of decommissioned segments. The encapsulating step preferably includes the step of forming a matrix within the chamber which integrally attaches to the vessel and integrally embeds the reactor internals to create a solid reactor capsule. Such a reactor capsule has an outer shell which is formed from the vessel and which substantially encases the matrix and thus the reactor internals. More particularly, this encapsulating is preferably accomplished by providing a fluidized matrix-creating material, preferably concrete, which may be predictably solidified and which functions as a radioactive shield in its solid state. The conversion of the reactor capsule is preferably accomplished by cutting the reactor capsule into transportable-size segments and then encasing these transportable-size segments.

30 Claims, 7 Drawing Sheets

METHOD OF DECOMMISSIONING A NUCLEAR REACTOR

FIELD OF THE INVENTION

This invention relates generally as indicated to a method of decommissioning a nuclear reactor and more particularly to a decommissioning process which includes the steps of encapsulating the relevant portions of the reactor into a solid integral reactor capsule and converting this reactor capsule into decommissioned transportable segments.

BACKGROUND OF THE INVENTION

A nuclear power cycle may be viewed as originating with a nuclear reaction which occurs within a component commonly called a "nuclear reactor." A nuclear reactor typically comprises a vessel which defines a chamber and a fuel core which is situated within this chamber. In commercial reactors for utility applications, the fuel core consists of a number of fuel rods which are arranged so that a self-sustaining nuclear reaction will take place. This nuclear reaction releases an enormous amount of energy which is used to transfer heat to a circulating fluid.

In one type of nuclear reactor, a "boiling water reactor" (BWR), the circulating fluid is water which is converted to steam within the reactor vessel and then supplied to the turbine of the power cycle. In another type of nuclear reactor, a "pressurized water reactor" (PWR), the circulating fluid is heated within the reactor vessel and then supplied to a closed heat exchanger, or steam generator, wherein the circulating fluid converts water to steam which is then supplied to the turbine of the power system. In either case, the reactor vessel will include input/output nozzles for the circulating fluid which are connected to the appropriate plant lines. Additionally, both BWR units and PWR units will include reactor internals which interact with the circulating fluid and/or which are used to control the fuel core.

As was indicated above, an enormous amount of energy is released during a nuclear reaction. In fact the amount of energy released per atom exceeds by a factor of several million the amount of energy obtainable per atom in a chemical reaction, such as the burning of fossil fuels. Consequently, nuclear power has become a very attractive alternative for the utility industry and more than 500 nuclear reactors are now either on-line or under construction world-wide. However, the nuclear reaction also emits potentially harmful radiation thereby creating sometimes complex construction and operating challenges. Additionally, and of particular interest in the present application, this radiation produces certain obstacles when dismantling or decommissioning a nuclear reactor at the end of its operating life. More specifically, the inside of the vessel, along with the reactor internals, will be considered radioactively contaminated thereby placing certain restrictions on the decommissioning of the reactor.

It should be noted at this point that removal and disposal of a nuclear reactor's fuel core is not normally considered part of the decommissioning process. This is due to the fact that it is an accepted industry practice to replace one-third of the fuel rods of a nuclear reactor each operating year. Consequently, the removal/disposal of the fuel core during a decommissioning process will usually not present any problems above and beyond those encountered during annual replacements. However, the decommissioning of the remaining portions the nuclear reactor, i.e., the vessel and the reactor internals, presents challenges not normally confronted during the maintenance of an on-line nuclear reactor.

In the past, the decommissioning of nuclear reactors has been accomplished almost exclusively by a "water platform" method. In such a method, the top of the reactor vessel is removed and the vessel is filled with water which thereby functions as a radioactive shield relative to the reactor internals. A platform is placed on top of the water and underwater cutting is performed on the pieces of the reactor internals located immediately beneath the platform. These pieces are then loaded onto the platform and transferred to either a "wet cutting station" in which further underwater cutting is performed or a "dry cutting station" in which further cutting is performed in an air-controlled environment. The resulting pieces of the reactor internals are then placed in "casks" which comprise a casing made of a radioactively shielding material. The water level is then decreased, the platform lowered, and the cutting process is again initiated. This sequence of events is repeated until all of the reactor internals have been removed. Thereafter the cutting of the reactor vessel itself is initiated.

This "water platform" method of decommissioning a nuclear reactor, while acceptably effective, places many time, cost and safety constraints on a decommissioning project. For example, although water functions as a radioactive shield, some worker interaction with the sectioned reactor internals will usually be experienced in the transfer between the water platform and the wet/dry cutting stations. Additionally, the cutting process usually produces a significant amount of particles whereby respirators and HEPA ventilation are sometimes necessary to combat the effects of airborne contamination. Furthermore, the "shielding" water in the vessel will absorb particles produced during the cutting process whereby constant circulation and filtration of this fluid is necessary to remove liquid radioactive waste.

An alternate method of decommissioning a nuclear reactor was recently used on a retired nuclear reactor at the Shippingport Power Plant. The Shippingport nuclear reactor was an offspring of the Eisenhower presidency and thus its decommissioning was orchestrated by the United States Department of Energy. In decommissioning this unit, the reactor vessel was filled with concrete and then moved in one piece to a disposal site. The Shippingport reactor, which was rated at 72 megawatts, was significantly smaller than most of the commercial nuclear reactors in use or construction today. Nonetheless, the weight of the reactor when filled with concrete required the fabrication of special lifting equipment to lift the reactor from its underground housing. More particularly, the project required the erection of a gigantic frame, the construction of four huge hydraulic jacks, each having an approximately 6,000 ton lifting capacity, and the mounting of these jacks on the frame. In the transfer of the Shippingport reactor to the transport vehicle (a barge in this case), the jacks hoisted the reactor seventy-seven feet into the air, moved it approximately thirty-eight feet horizontally along a track and then lowered it onto a trailer.

The Energy Department's decision to decommission the Shippingport reactor in this manner, which avoided cutting apart the radioactive structure, saved an estimated seven million dollars and, perhaps more importantly, dramatically reduced worker exposure to radiation. However, such a procedure is probably not possible for most commercial reactors which possess an average rating of approximately 1000 megawatts, and would weigh over 2500 tons if filled with concrete. Moreover, even if larger reactors could be moved in one piece, the capital cost of fabricating the necessary lifting equipment would probably make such an approach economically unfeasible.

Applicant therefore believes that a need remains for a cost effective method of decommissioning a nuclear reactor in which radiation exposure is minimized.

SUMMARY OF THE INVENTION

The present invention provides a cost effective process of decommissioning a nuclear reactor in which radiation exposure is minimized. More particularly, the present invention provides a method of decommissioning a nuclear reactor which comprises the steps of encapsulating portions of the reactor vessel and reactor internals into a solid reactor capsule and then converting this reactor capsule into a plurality of decommissioned segments. The conversion of the reactor capsule is preferably accomplished by cutting the reactor capsule into transportable-size segments and then encasing these transportable-size segments. The cutting procedure may be performed in two stages, namely cutting the reactor capsule into a series of sections and then subsequently cutting each of these sections into a plurality of transportable-size segments.

The encapsulating step preferably includes the step of forming a matrix within the chamber which integrally attaches to the vessel and integrally embeds the reactor internals to create a solid reactor capsule. Such a reactor capsule has an outer shell which is formed from the vessel and which substantially encases the matrix and thus the reactor internals. More particularly, this encapsulating is preferably accomplished by providing a fluidized matrix-creating material which may be predictably solidified and which functions as a radioactive shield in its solid state. The fluidized matrix-creating material is introduced into the reactor chamber and then solidified in such a manner that it integrally attaches to the vessel and integrally embeds the reactor internals to form the reactor capsule. Concrete is the preferred matrix-creating material because it performs well as a matrix, it is compatible with the subsequent cutting steps, and, perhaps most importantly, it functions quite effectively as a radioactive shield. When concrete is used as the matrix-creating material, the "solidifying" step entails simply waiting for the concrete to cure.

The cutting of the reactor capsule preferably includes the steps of cutting a first section of the capsule and then transferring it to a location away from the direct locality of the remaining portion of the capsule. Thereafter, a second section is then cut from the remaining portion of the capsule and then this section is transferred to a location away from the direct locality of the now remaining portion of the capsule. This sequence is repeated until all of the relevant portions of the reactor capsule have been transferred. The size of the reactor sections is chosen so that pre-existing in-house equipment, such as the reactor building crane, may be utilized during the transferring step.

The series of sections formed from the reactor capsule are preferably transferred to an appropriate secondary cutting station within the reactor building and this appropriate secondary cutting station will in most instances be either a dry cutting station or a wet cutting station. The sectioned reactor capsule is then further cut, if necessary, into transportable-size segments which each include a portion of the outer shell and a portion of the matrix. Sheets, which are dimensioned to cover the exposed surfaces of the matrix, are then attached to the transportable segment to cover these exposed surfaces. In this manner, the reactor internals will be embedded within a radioactively shielding matrix and this matrix will be further encased by the portions of the vessel and the encasing sheets. As such, the need for shipping casks will be eliminated in many situations.

Thus decommissioning a nuclear reactor according to the present invention provides several advantages over the prior art processes. For example, the cutting of the vessel and the reactor internals occurs substantially simultaneously whereby the preferred method provides for removal of both the reactor vessel and the reactor internals for essentially the same cost as individually removing either of these components with the water-platform method. Additionally, during the cutting steps and all subsequent steps, the reactor internals are embedded in a material which functions as a radioactive shield whereby worker interaction and environmental exposure to contaminated components is minimized. Furthermore, in contrast to the Shippingport decommissioning method, "in-house" lifting equipment may be used instead of specially fabricated units and this will usually substantially reduce the overall cost of the decommissioning project. Still further, the encasing step of the method will eliminate the need for shipping casks in many situations.

These and other features of the invention are fully described and particularly pointed out in the claims. The following descriptive annexed drawings set forth in detail one illustrative embodiment, this embodiment being indicative, however, of but one of the various ways in which the principles of the invention may be employed.

DETAILED DESCRIPTION

Figure 1:
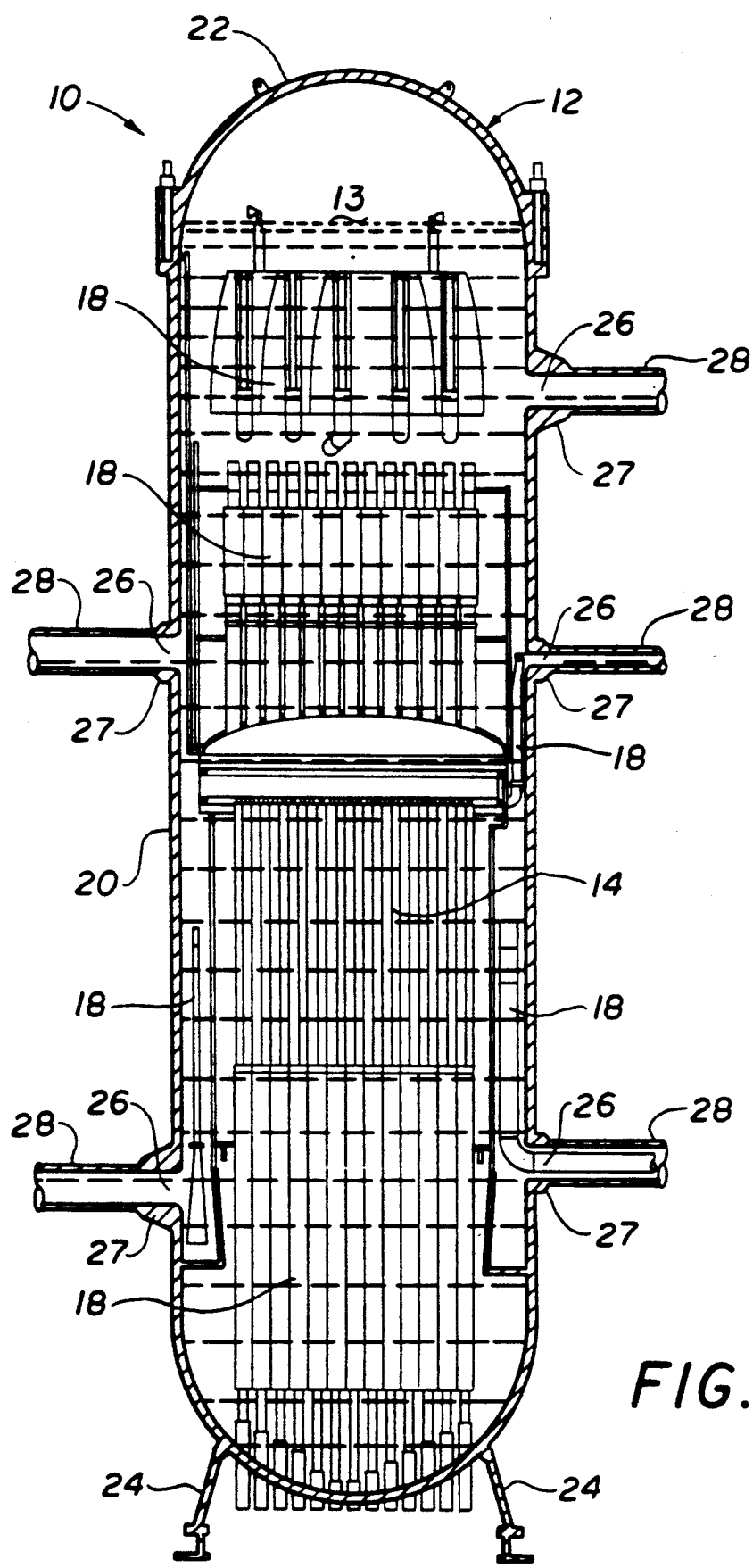
FIG. 1 is a front view of the nuclear reactor prior to decommissioning, the vessel of the reactor being shown in section and its other components being shown in elevation.

Referring now to the drawings in detail and initially to FIG. 1, a nuclear reactor is indicated generally at 10. The nuclear reactor 10 comprises a vessel, indicated generally at 12, defining a chamber 13, a fuel core 14 situated within the chamber 13, and reactor internals 18 also situated within the chamber 13. The vessel 12 includes a main body portion 20 and a top closure head 22 coupled thereto. The illustrated vertical orientation of the vessel 12 is maintained by a bracing system which includes legs 24 mounted on the floor of the reactor building. The main body portion 20 of the vessel 12 includes inlet/outlet nozzles 26 which are surrounded by thick flanges 27 for integrity purposes and which are connected to the appropriate plant lines 28.

Figure 2:
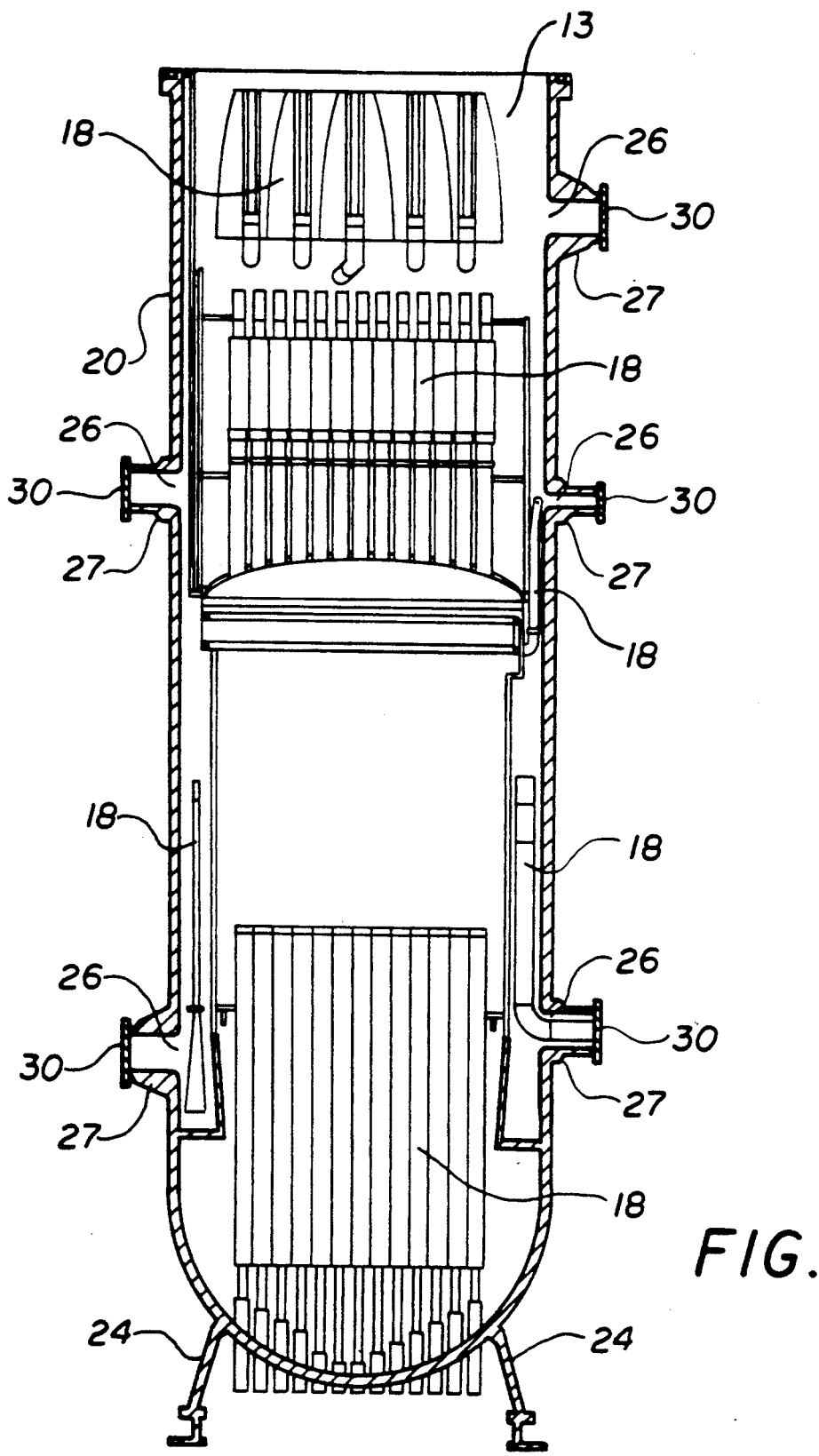
FIG. 2 is a front view of the nuclear reactor of FIG. 1 after certain preparatory steps of the decommissioning process have been completed.

In FIG. 2, the nuclear reactor 10 is shown after preparatory steps of the decommissioning process have been completed. These preparatory steps include uncoupling the top closure head 22 from the main body portion 20 and draining the fluid from the reactor chamber 13 through the appropriate nozzle(s) 26. Additionally, the fuel core 14 is removed in any suitable manner, and probably in the same manner as that used during annual replacements. Still further, the plant lines 28 are severed from their respective nozzles 26 and metal plates 30 are welded over the severed open ends of the nozzles 26.

Referring now to FIGS. 3-8, a method of decommissioning the nuclear reactor 10 according to the present invention is shown. This method includes the steps of encapsulating portions of the vessel 12 and reactor internals 18 into a solid reactor capsule 50 and then converting this reactor capsule 50 into a plurality of decommissioned segments 100. The conversion step of this decommissioning process includes a cutting stage in which the reactor capsule 50 is cut into transportable-size segments and an encasing stage in which the transportable-size segments are encased to form the decommissioned segments. In some situations, the cutting stage will comprise a primary "capsule-cutting" procedures in which the reactor capsule 50 is cut, preferably sequentially, into a series of sections 50A-50L and a secondary cutting procedures in which each of these sections is further cut into a plurality of transportable-size segments. It should be noted that "cut" in this context corresponds to any sectioning, segmenting, or dividing process in which a component is converted into a plurality of pieces.

Decommissioning the nuclear reactor 10 according to the present invention provides several advantages over prior art decommissioning processes. For example, the cutting of the vessel 12 and the reactor internals 18 occurs substantially simultaneously thereby reducing the decommissioning time and cost. In fact, the preferred method provides for removal of both the reactor vessel 12 and the reactor internals 18 for essentially the same cost as individually removing either of these components. Additionally, during the cutting steps, and during all subsequent steps of the decommissioning process, the reactor internals 18 are embedded in a material which functions as a radioactive shield whereby worker interaction and environmental exposure to contaminated components is minimized when compared to prior art procedures involving the cutting of isolated reactor internals. Still further, "in-house" lifting equipment may be used instead of specially fabricated units which will usually substantially reduce the overall cost of the decommissioning project. The encasing step of the method will eliminate the need for shipping casks in many situations thereby reducing total disposal cost. These advantages will become more apparent in the following detailed discussions of the stages of the preferred decommissioning process.

i. Encapsulating Stage

Figure 3:
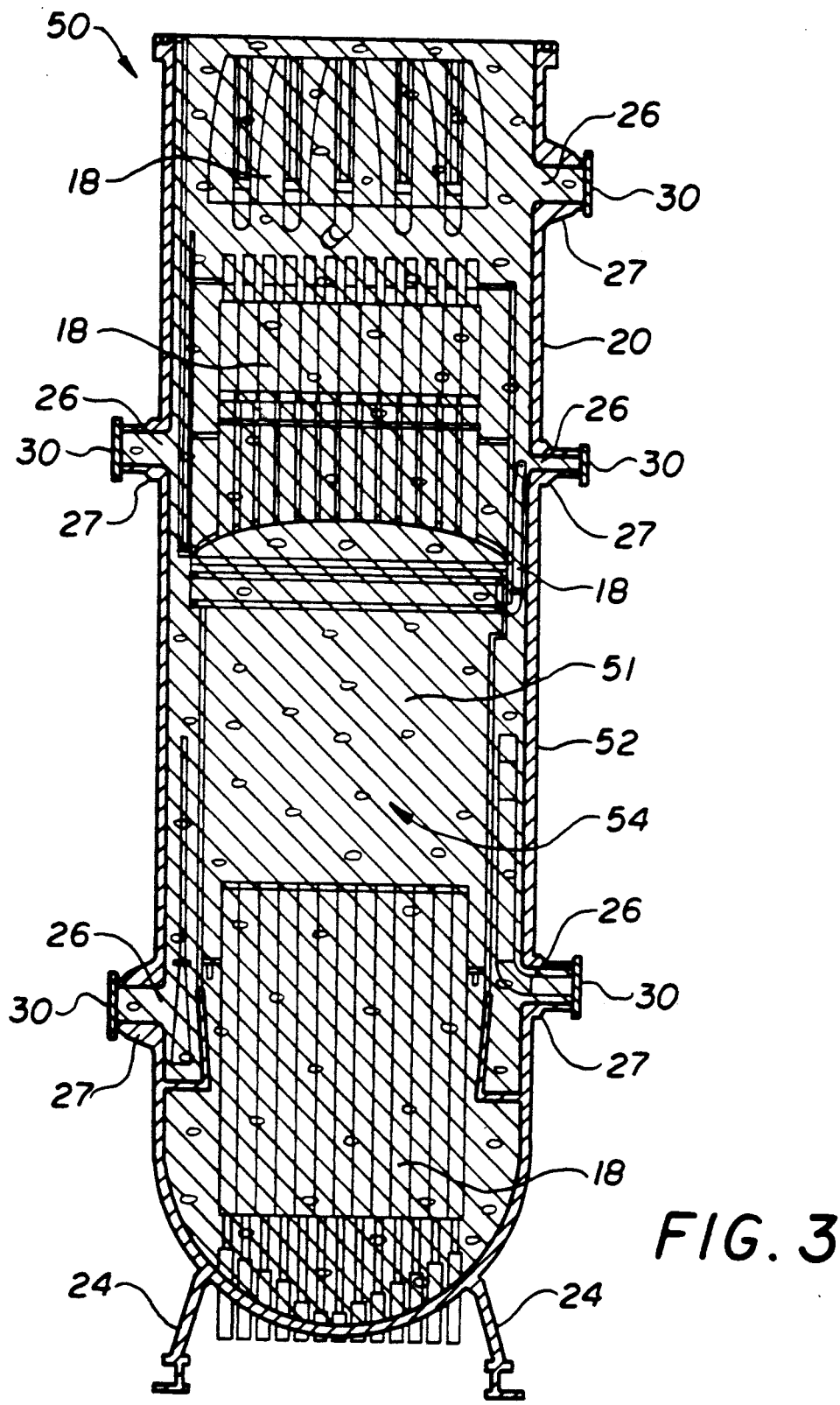
FIG. 3 is a front view of a reactor capsule created during an encapsulating step of the decommissioning process, the shell and the matrix of the capsule being shown in section and the reactor internals being shown in elevation.

In the "encapsulating" stage of the decommissioning process, the relevant portions of the vessel 12 and the reactor internals 18 are encapsulated to create the solid reactor capsule 50 shown in FIG. 3. "Encapsulate" in this context corresponds to converting the relevant portions of the nuclear reactor 10 into a solid, substantially integral mass. In the illustrated and preferred embodiment, the relevant portions of the vessel 12 include substantially all of the main body portion 20 and all of the reactor internals 18.

The encapsulating stage of the process preferably includes a matrix-forming step in which a matrix 51 is formed within the relevant portions of the reactor chamber 13. This matrix 51 integrally attaches to the vessel 12 and integrally embeds the reactor internals 18 to create the solid reactor capsule 50. When the capsule 50 is created in this manner, it will have an outer shell 52 which substantially encases a solid center 54. The shell 52 is formed from the main body portion 20 of the vessel 12 and the center 54 is formed from the matrix 51 and the reactor internals 18 embedded therein.

The matrix 51 is preferably formed by providing a fluidized matrix-creating material which may be predictably solidified and which functions as a radioactive shield in its solid state. The matrix-creating material is introduced into the chamber 13 by pouring it through the open top of the main body portion 20 or, alternatively, by pumping it through one or more of the nozzles 26. The introduced matrix-creating material is then solidified in such a manner that it integrally attaches to the vessel 12 and integrally embeds the reactor internals 18. (In some instances the integral attachment to the vessel may be accomplished simply by the "tight fit" of the matrix material within the vessel). Concrete is the illustrated and preferred matrix-creating material because it performs well as a matrix, it is compatible with the subsequent cutting steps and, perhaps most importantly, it functions quite effectively as a radioactive shield. When concrete is used as the matrix-creating material, the "solidifying" step entails simply waiting for the concrete to cure.

The relevant portions of the nuclear reactor 10, such as the main body portion 20 of the vessel 12 and the reactor internals 18, preferably remain in their operating orientation and operating location during the encapsulating stage. For these reasons, applicants believe that in most, if not all, nuclear settings, the support system of the nuclear reactor will be sufficient to securely hold the capsule 50 in this position. In this regard, it is interesting to note that reactor capsule 50, although carrying the additional burden of the matrix 51, will be relieved of the weight of the reactor core and the circulating fluid sustained by the reactor 10 during on-line operation. Consequently, the weight differential between the on-line nuclear reactor 10 and the reactor capsule 50 will be substantially less than the weight of the matrix 51. Moreover, nuclear regulatory codes consistently require that reactors be supported in a manner which is capable of withstanding pressures substantially exceeding operating parameters and seismic loading.

In any event, the encapsulating step of the decommissioning process creates a solid reactor capsule 50 having a shell 52, which is formed from a portion of the vessel 12, and a solid center 54 which is formed from the radioactive shielding matrix 51 and the reactor internals 18 embedded therein.

ii. Capsule-Cutting Stage

Figure 4:
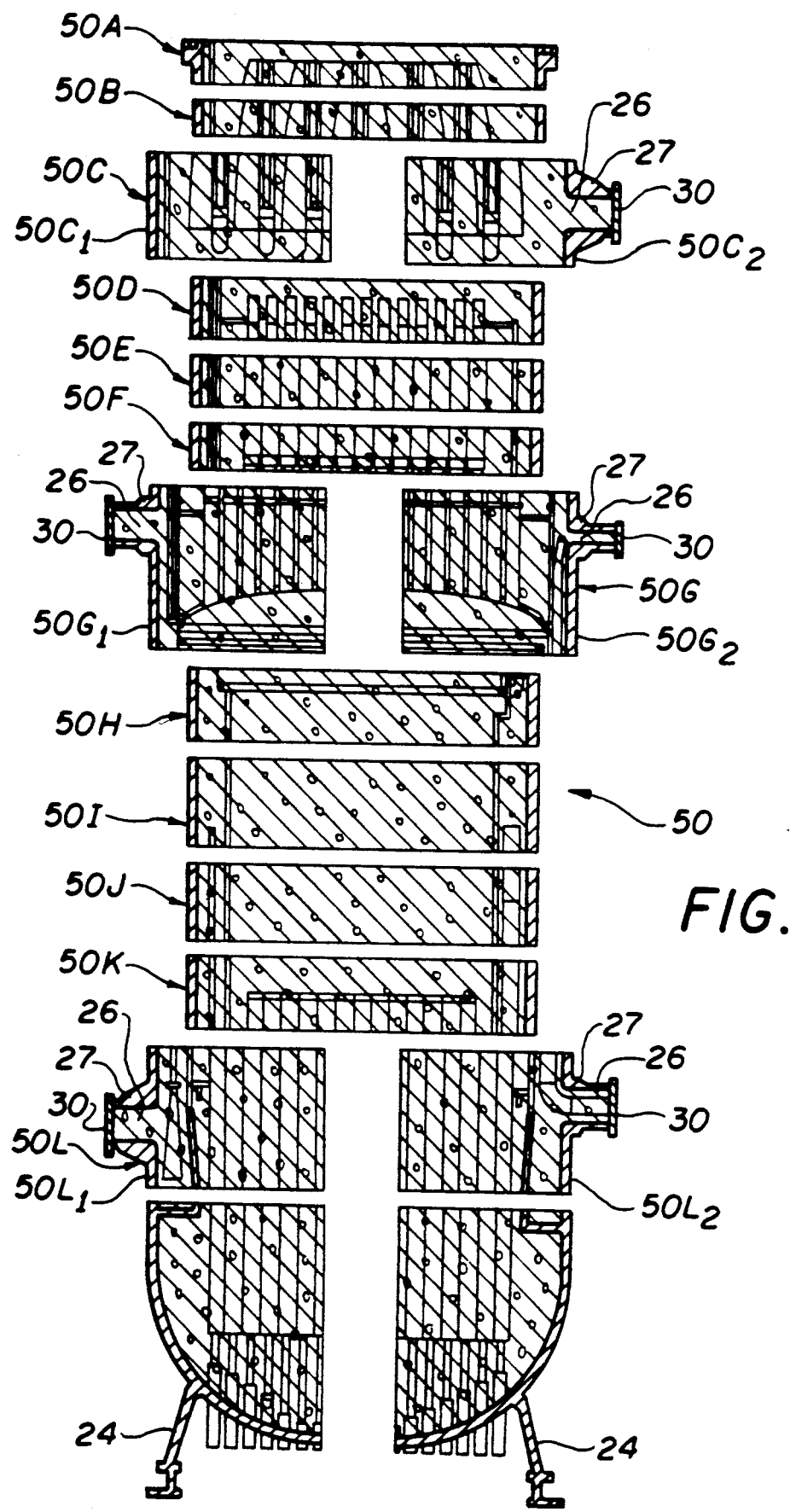
FIG. 4 is a schematic view of the sections created from the reactor capsule during a capsule-cutting stage of the process.

After completion of the encapsulating stage of the decommissioning process, the reactor capsule 50 is cut into sections 50A-50L as is shown schematically in FIG. 4. It is important to note that during this cutting step, and during all subsequent steps of the decommissioning process, the reactor internals 18 are encased in the matrix 51 which functions as a radioactive shield in its solid state. Thus, worker interaction and environmental exposure to contaminated components is minimized when compared to prior art procedures involving the cutting of isolated reactor internals.

As is shown in FIG. 4, the sections are essentially "coin-shaped38 and the size, or more particularly, thickness, of these sections is preferably chosen so that they may be manipulated within the reactor building with existing equipment. Thus, in most instances, the size of the sections will be determined by the lifting capacity of a semi-permanent building crane, which in a typical nuclear power plant would probably be less than 400 tons. The use of "in-house" lifting equipment, rather than specially fabricated units, will usually serve to substantially reduce the overall cost of the decommissioning project.

The preferred relative size and shape of the sections 50A-50L is illustrated schematically in FIG. 4, and, as shown, the sections 50A, 50B, 50D, 50E, 50F, 50H, 50I, 50J and 50K are formed by substantially horizontal cutting lines. In such a cutting arrangement, the shell 52 of the reactor capsule 50 (which is formed by the portions of the vessel 12) and the matrix 51 of the capsule 50 (which includes the reactor internals 18) will both be cut by a single cutting line. Thus, in contrast to prior art decommissioning methods, the cutting of the vessel 12 and the reactor internals 18 occurs substantially simultaneously.

The remaining illustrated sections 50C, 50G and 50L are also formed by substantially horizontal cutting lines which create coin-shaped sections. However, the sections 50C, 50G, and 50L, which are substantially thicker than the other sections, are then cut into semi-sections by vertical cutting lines. More particularly, section 50C is cut into semi-sections $50C_1$ and $50C_2$, section 50G is cut into semi-sections $50G_1$ and $50G_2$, and section 50L is cut into semi-sections $50L_1$ and $50L_2$. The reason for the different treatment of these sections 50C, 50G and 50L, is that they each contain at least one inlet/outlet nozzle 26 and thus, a corresponding annular flange 27. The cutting of the sections 50C, 50G and 50L into semi-sections eliminates the need to cut directly through the sometimes massive flanges 27.

The capsule-cutting steps are preferably accomplished with a diamond wire cutting system such as that marketed under the name "Trentec." The Trentec diamond wire system comprises a diamond matrix wire made to length for each individual cut and a hydraulic drive apparatus. The diamond wire is routed to envelope the cut area and then the wire is guided back to a drive wheel located on the hydraulic drive apparatus. The drive wheel rotates and pulls the wire through the cut area. The Trentec cutting system is particularly suited for the present method because it lends to substantially remote operation whereby worker interaction with contaminated components may be minimized. Additionally, the dust and/or particles created by the Trentec cutting system are practically nonexistent when compared to other conventionally used cutting techniques. Consequently, HEPA ventilation and the need to wear respirators during cutting operations is eliminated because airborne contamination will not be generated. Furthermore, because the equipment may be lubricated solely with a small volume of cooling water, any liquid radioactive waste may be minimized by recirculating the cooling water through settling drums designed to collect any radioactive debris.

Still further, the illustrated cutting arrangement coordinates very efficiently with the Trentec cutting technique. More particularly, the cutting wire may be positioned at a predetermined location or level on the capsule 50 and appropriately pulled to cut the capsule 50 and form the first section 50A. Thereafter, the cutting wire may be moved downwardly by a pulley-system to the next "cutting" level to perform a subsequent cut and form the second section 50B. The same pulleys may be rearranged and used for the vertical cuts on sections 50C, 50G and 50L.

When concrete is used as the matrix-creating material, the material make-up of the reactor capsule 50 will be extremely compatible with the Trentec cutting system which is specifically designed for the removal of concrete. It may be additionally noted that in the "water platform" decommissioning method, the Trentec diamond cutting wire was not used to cut the submerged reactor internals because their mounting allowed them to vibrate, or "wobble", during the cutting process. Consequently, the benefits of the Trentec cutting system, such as low airborne contamination and uncomplicated lubrication, could not be enjoyed in the past. However, in the present invention, the embedding of the reactor internals 18 in the matrix material eliminates any vibration whereby the advantages of the Trentec cutting system may be realized. Moreover, a concrete matrix appears to additionally facilitate the sawing process because it provides a substantially uniform density across the cutting line and extremely compatible surface qualities.

In the preferred method of decommissioning the nuclear reactor 10, the primary-cutting stage of the process will begin with the capsule 50 being cut to create the top, or first, section 50A. This first section 50A is then transferred to a location away from the direct locality of the remaining portion of the capsule, such as an appropriate secondary cutting station within the reactor building. Upon transfer of the first section 50A, the remaining portion of the reactor capsule 50 is cut to form the second section 50B, and this section is then transferred away from the direct locality of the now remaining portion of the capsule 50. This sequence is repeated until all of the sections 50A-50L have been created and transferred.

The transfer of the sections/semi-sections 50A-50H will preferably be performed with existing equipment, such as the building crane discussed above. As such, the sections 50A-50L will have to be rigged to accommodate the crane, or supplied with lifting lugs which may be coupled to the crane. Although the lugs could possibly be attached after a particular section has been cut from the reactor capsule 50, they are preferably attached prior to this cutting step after the location of the cutting lines has been determined. More particularly, the lugs may be welded to the capsule shell 52 prior to the capsule-cutting and/or they may be welded to the vessel 12 prior to the encapsulating step.

Figure 5:
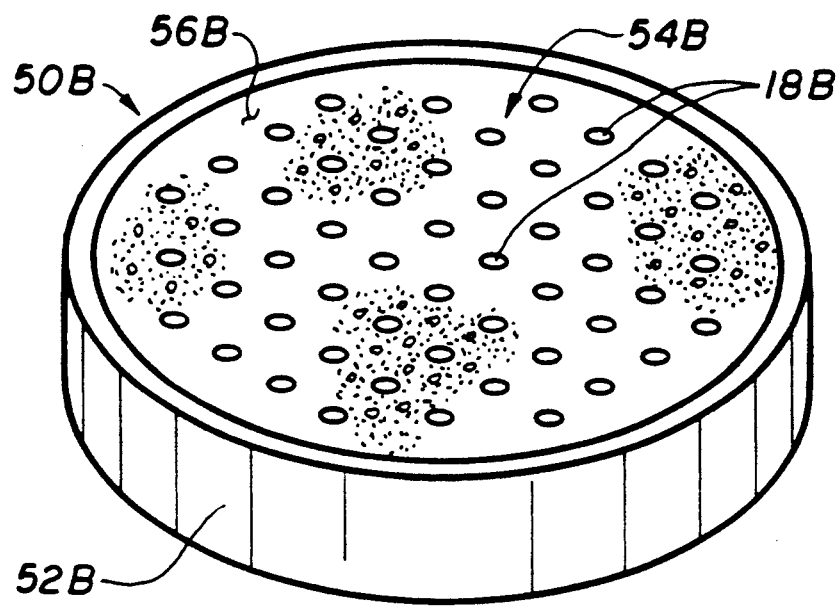
FIG. 5 is an isolated perspective view of one of the sections formed during the capsule-cutting stage.

A representative section, namely the second section 50B, is illustrated in detail in FIG. 5 and, as shown, the section 50B includes an outer annular ring 52B, or more generally a parametrial frame, having an integral filling 54B. The annular ring 52B is formed from a slice of the capsule shell 52, and thus was originally part of the reactor vessel 12. The integral filling 54B is formed from a slab of the capsule center 54, and thus includes a layer of the radioactive shielding matrix 51 and pieces 18B of reactor internals embedded therein. It may be noted for future reference that the exposed surfaces of the filling 54B, namely the axial end faces 56B, are substantially planar.

iii. Secondary-Cutting Stage

As was indicated above, the size and shape of the sections/semi-sections 50A-50L will usually be chosen to maximize the efficiency of the primary lifting equipment, i.e., the building crane. However, this particular geometry may substantially exceed the parameters necessary to safely transport the decommissioned reactor components to a disposal site. For example, if the lifting capacity of the utilized crane is 120 tons, this will be reflected in the cutting of the reactor capsule 50 whereby each section/semi-section will preferably weigh approximately 120 tons. At the same time, shipping requirements could very well dictate that the transported pieces weigh a maximum of approximately 30 tons. Additionally, a sometimes related, but often independent, consideration is the sizing of the section to be transported relative to the available access openings in the reactor building, the loading dock area and/or the transporting vehicle. For this reason, the decommissioning method may include secondary-cutting steps in which the sections/semi-sections 50A-50L are further cut into transportable segments.

Figure 6:
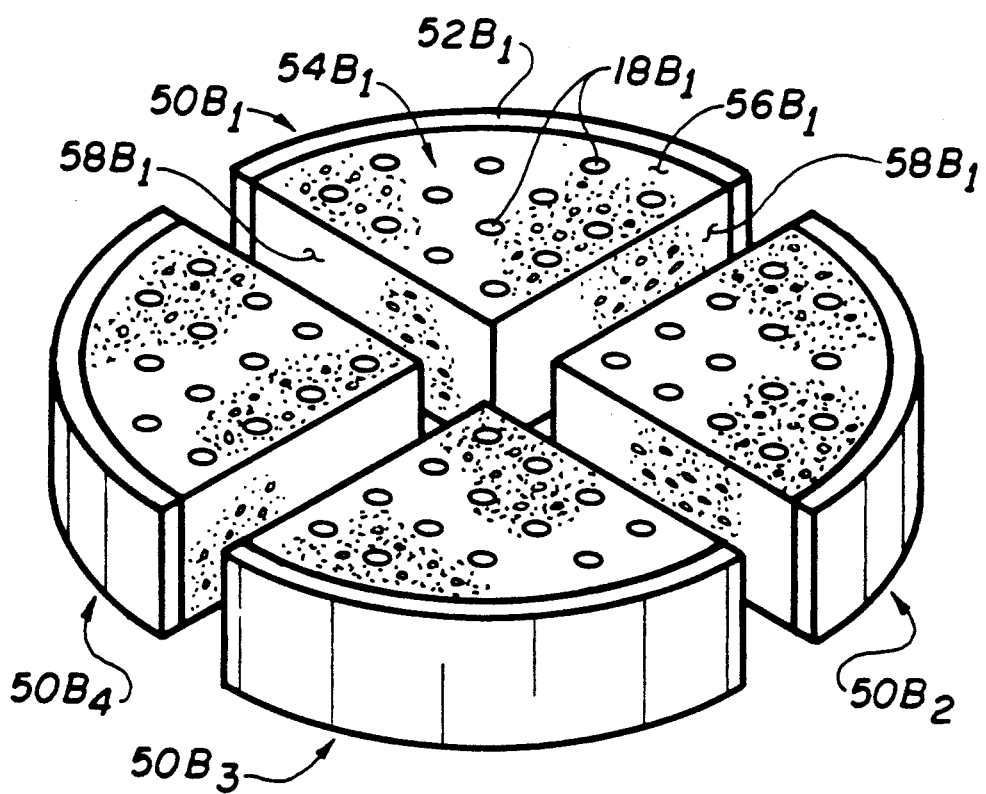
FIG. 6 is a perspective view of transportable-size segments created from the section shown in FIG. 5 during secondary cutting steps.

For the purposes of this discussion, it is assumed that the representative section 50B is too heavy/wide for transportation purposes and that segments of approximately a quarter of this weight/width would be transportable. Accordingly, as is shown in FIG. 6, the section 50B is cut, preferably equally, into four segments $50B_1$, $50B_2$, $50B_3$, and $50B_4$ at an appropriate cutting station. The appropriate cutting station for the section 50B, as well as sections 50A, 50C-50G and 50L would probably be a dry cutting station. The appropriate cutting station for sections 50H-50K, which correspond to the fuel-containing area of the nuclear reactor 10, would probably be a wet cutting station. In either event, the secondary cutting is preferably accomplished by the Trentec cutting technique due to its low air/water contamination and undemanding lubrication needs.

The geometry of the segment $50B_1$ is probably best described as being shaped like a "pie-piece." The segment $50B_1$ includes a 90° ringlet $52B_1$ and a quadrant $54B_1$ projecting therefrom, or, in more general terms, a frame fragment $52B_1$ and an integral extension $54B_1$. The ringlet $52B_1$ is formed from a piece of the annular ring 52B of the segment 50B, and thus is formed from the reactor vessel 12. The quadrant $54B_1$ is formed by cutting a quarter piece of the integral filling 54B and thus is formed from the radioactive matrix 51 and the reactor internal pieces $18B_1$ embedded therein. The ringlet $52B_1$ surrounds and covers the curved circumferential surface of the quadrant $54B_1$ while its axial end faces $56B_1$, as well as its radial side faces $58B_1$, are exposed. These exposed surfaces $56B_1$ and $58B_1$ are all substantially flat or planar, and each is bordered by edges of the ringlet $52B_1$. The remaining segments $50B_2$, $50B_3$, and $50B_4$ will have essentially identical characteristics.

In the illustrated example, the size and shape of the segments $50B_1$, $50B_2$, $50B_3$, and $50B_4$ is assumed to meet transporting requirements whereby no further cutting is necessary. However, in the event that a further reduction in size/weight was necessary, the segments would be further cut until an appropriate geometry was achieved. The secondary cutting steps are preferably performed in a similar manner on the other sections of the reactor capsule 50 so that the exposed surfaces of the respective matrix slabs are all substantially flat or planar, and each is bordered by edges of a ringlet formed from the reactor vessel 12. In other words, the further cutting would result in transportable-size segments which are shaped like a "pie-piece."

iv. Encasing Stage

Figure 7A:
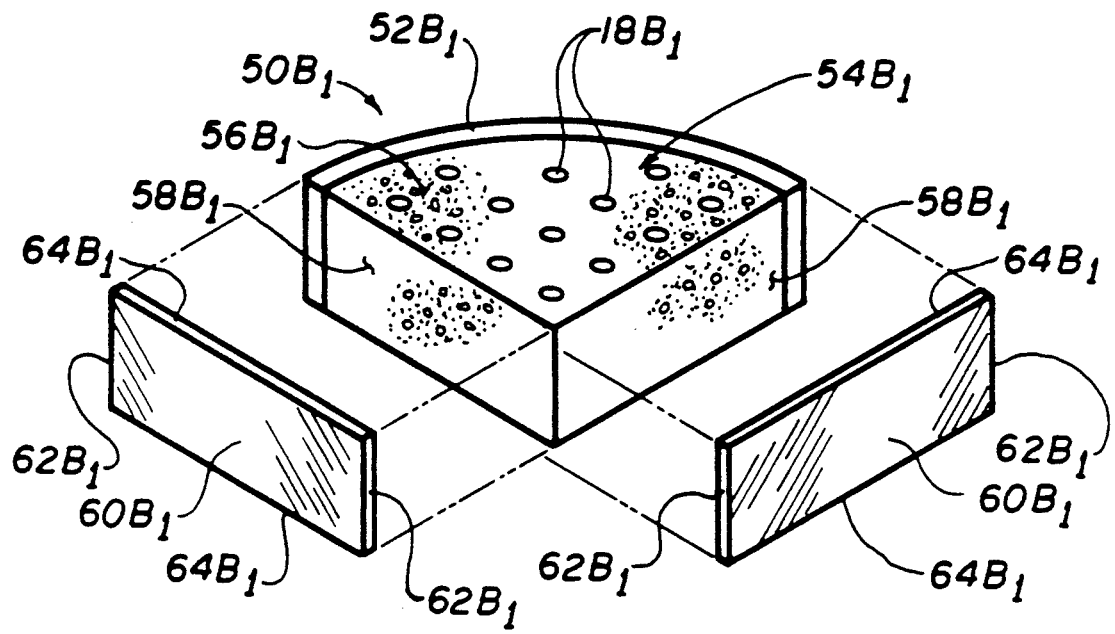
FIGS. 7A-7C are perspective views of one of the transportable-size segments during various stages of an encasing step.
Figure 7B:
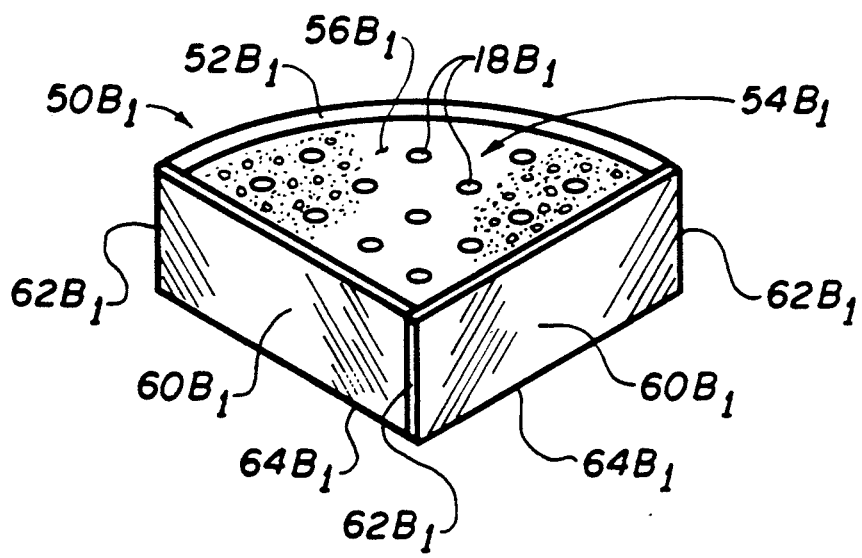
Figure 7C:
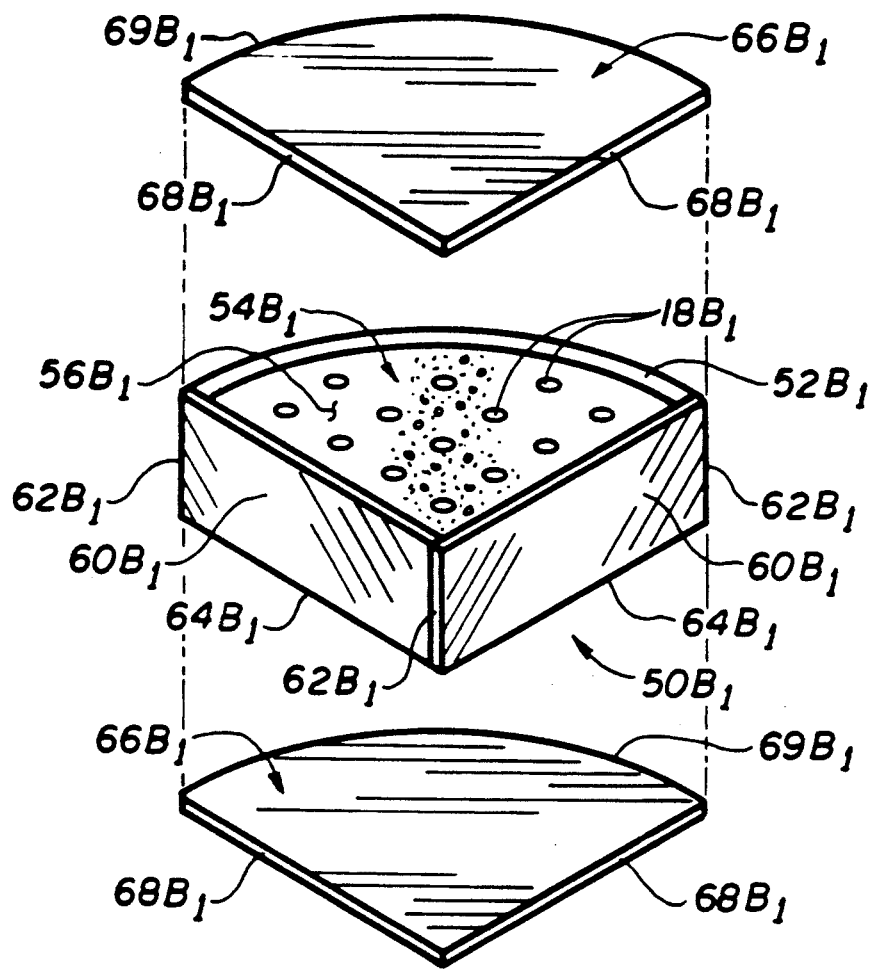
Figure 8:
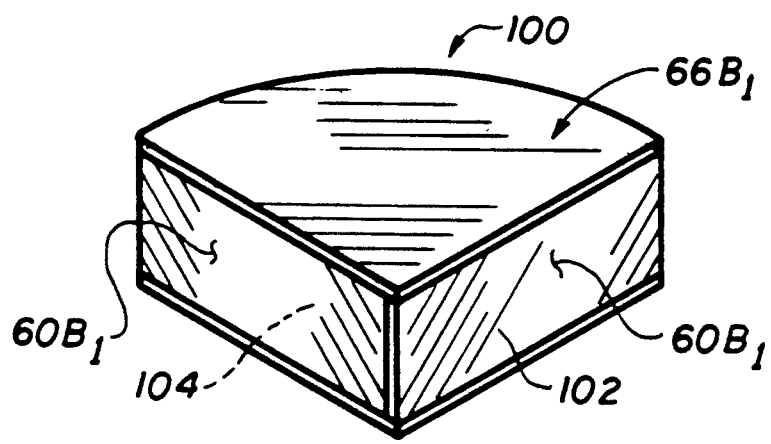
FIG. 8 is a perspective view of a decommissioned segment.

The final stage of the conversion of the reactor capsule 50 into a plurality of decommissioned segments entails encasing the transportable-size segments. This encasing stage particularly involves covering the exposed surfaces of the integral extension $54B_1$ so that the transportable-size segment is fully encased, or decommissioned. The preferred encasing procedure is shown in FIGS. 7A-7C in which the transportable-size segment $52B_1$ is used for the purposes of explanation. The encasing procedure particularly includes providing rectangular steel sheets $60B_1$ dimensioned to cover the radial surfaces $58B_1$ of the segment $52B_1$. (See FIG. 7A). Each of the sheets $60B_1$ includes a first pair of opposite edges $62B_1$ and a second pair of opposite edges $64B_1$. Because the exposed surfaces $58B_1$ are flat, the sheets $60B_1$ may likewise be flat whereby their formation is uncomplicated.

The steel sheets $60B_1$ are then welded to the segment $52B_1$ to cover the exposed surfaces $58B_1$. More particularly, one of the sheets $60B_1$ is placed over one of the surfaces $58B_1$ and the edge $62B_1$ abutting the ringlet $52B_1$ is welded thereto, and the other sheet $60B_1$ is placed over the other surface $58B_1$ and its edge $62B_1$ abutting the ringlet $52B_1$ is welded thereto. In this arrangement, the opposite edges $62B_1$ of each of the rectangular sheets will meet at a corner and are welded to each other at this corner. (See FIG. 7B).

The encasing procedure further includes providing steel sheets $66B_1$ which are shaped and sized to cover the axial end faces $56B_1$ of the segment $52B_1$. (Again, because the exposed surfaces $56B_1$ are flat, the sheets $66B_1$ may likewise be flat whereby their formation is uncomplicated.) In the illustrated embodiment, this shape will be in the form of a triangle having two equal sides $68B_1$ and a rounded base $69B_1$. One sheet $66B_1$ is placed over each of the faces $56B_1$, and its sides $68B_1$ are welded to the abutting edges $64B_1$ of the rectangular sheets $60B_1$. Additionally, the rounded bases $69B_1$ of the sheets $66B_1$ will be welded to the abutting edges of the ringlet $52B_1$. In this manner, the integral extension $54B_1$, and thus the pieces $18B_1$ of the reactor internals embedded therein, are totally encased to form the decommissioned segment 100 shown in FIG. 8.

If the preferred cutting steps are used, the encasing procedure will be conceptually the same regardless of the sectioning needed to create transportable segments.

For example, if further cutting of the segment 52B₁ is necessary to meet transporting requirements, the encasing procedure for the resulting "pie-piece" segments would be essentially identical to that described above, except that the dimensions of the base side 69B₁ of the top/bottom sheets 66B₁ would be appropriately reduced. (The dimensions of the sides 68B₁ of the sheets 66B₁ and the overall shape and size of the rectangular sheets 60B₁ would remain the same). Likewise, if "semi-sections" of the section 50B were of an appropriate transportable size, a single rectangular sheet (which is approximately twice as long as each of the rectangular sheets 60B₁) and two semi-circle sheets would be used in the encasing procedure. Additionally, in the event that section 50B was of a transportable size (and thus itself constituted a transportable-size segment), the encasing procedure would entail placing circular sheets over the exposed faces 56B and the circumferential edges of these circular sheets would be welded to the abutting edges of the ring 52B.

Thus, regardless of the size and shape of the transportable segment, the encasing procedure will produce a decommissioned segment 100 having a casing 102 which totally encases a solid interior chamber 104. The casing 102 will include at least one wall 52B₁ which is formed from a portion of the vessel 12 and the interior chamber 104 will include a chunk of the matrix 51 which is integrally attached to the wall 52B₁ and which integrally embeds pieces of the reactor internals 18 therein. This encasing step maintains the intactness of the segment and/or provides radiation shielding of the reactor internals contained therein. In many situations, this encasing in combination with the matrix 51 will eliminate the need for shipping casks thereby reducing total disposal cost.

v. Closing

One may now appreciate that the present invention provides a method of decommissioning a nuclear reactor 10 which may significantly reduce man-rem exposure and may substantially decrease the time and capital expenditure of a decommissioning project. The cutting of the vessel 12 and the reactor internals 18 occurs substantially simultaneously thereby reducing the decommissioning time and cost. Additionally, during the cutting steps, and during all subsequent steps of the decommissioning process, the reactor internals 18 are embedded in the radioactive shield matrix 51 whereby exposure to contaminated components is minimized. Still further, the method allows the use of "in-house" lifting equipment and eliminates the need for separate shipping casks in many situations.

Although the invention has been shown and described with respect to a certain preferred embodiment, it is obvious that equivalent alterations and modifications will occur to others skilled in the art upon the reading and understanding of this specification. For example, the method could be used for disassembling any nuclear device, (such as a steam generator used in conjunction with a pressurized water reactor) which includes a receptacle defining a cavity and radiation-exposed internal components positioned within the cavity. The present invention includes all such equivalent alterations and modifications and is limited only by the scope of the following claims.

What is claimed is:

1. A method of decommissioning a nuclear reactor including a vessel defining a chamber and reactor internals positioned within said chamber, said method comprising the steps of:
    encapsulating the vessel and reactor internals into a solid reactor capsule by forming a matrix within the chamber which integrally attaches to the vessel and integrally embeds the reactor internals to create the solid reactor capsule whereby the capsule will have an outer shell which is formed from the vessel and which substantially encases the matrix and thus the reactor internals;
    converting the reactor capsule into a plurality of decommissioned segments by cutting the reactor capsule into segments which each include a portion of the outer shell and a portion of the matrix and the reactor internals embedded therein whereby each of the segments includes a portion of the reactor vessel and pieces of the reactor internals;
    providing sheets which are dimensioned to cover the exposed surfaces of the matrix of the segments; and
    attaching the sheets to the segment to cover the exposed surfaces.

2. A method as set forth in claim 1 wherein said cutting step includes the steps of:
    cutting the reactor capsule into a series of sections; and
    subsequently cutting each of these sections into a plurality of segments.

3. A method as set forth in claim 1 wherein said encapsulating step includes the step of encapsulating all of the reactor internals into the solid reactor capsule.

4. A method as set forth in claim 1 wherein said matrix-forming step comprises the steps of:
    providing a fluidized matrix-creating material which may be predictably solidified and which functions as a radioactive shield in its solid state;
    introducing the fluidized matrix-creating material into the reactor chamber; and
    solidifying the matrix-creating material in such a manner that it integrally attaches to the vessel and integrally embeds the reactor internals to form the reactor capsule.

5. A method as set forth in claim 4 wherein said step of providing a fluidized matrix-creating material comprises the step of providing concrete in a fluid form.

6. A method as set forth in claim 1 wherein said step of cutting the reactor capsule includes the step of cutting the reactor capsule into a series of sections which each weigh less than 400 tons.

7. A method as set forth in claim 1 wherein said step of cutting the reactor capsule includes the step of cutting the reactor along horizontal cutting lines each of which creates a section.

8. A method as set forth in claim 7 wherein said step of cutting the reactor capsule includes the step of cutting the reactor along horizontal cutting lines each of which creates a section and each of which passes through both the capsule shell and the capsule center whereby the cutting of the vessel and the reactor internals occurs substantially simultaneously.

9. A method as set forth in claim 1 wherein said step of cutting the reactor capsule includes the step of cutting the reactor along cutting lines each of which creates a section and each of which passes through both the capsule shell and the capsule center whereby the cutting of the vessel and the reactor internals occurs substantially simultaneously.

10. A method as set forth in claim 9 wherein said step of cutting the reactor capsule includes the step of cutting at least some of the sections into semi-sections.

11. A method as set forth in claim 2 wherein said step of cutting the reactor capsule includes the steps of:
providing a diamond matrix wire;
providing a hydraulic drive apparatus having a drive wheel;
routing the diamond wire so that it envelopes a cutting area of the reactor capsule;
guiding the wire back to the drive wheel and coupling it thereto; and
rotating the drive wheel so that the diamond wire is pulled through the cutting area of the reactor capsule.

12. A method as set forth in claim 1 wherein said step of cutting the reactor capsule includes the steps of:
cutting a first section of the capsule;
transferring the first section to a location away from the direct locality of the remaining portion of the capsule;
thereafter cutting a second section from the remaining portion of the capsule; and
transferring the second section of the capsule to a location away from the direct locality of the now remaining portion of the capsule.

13. A method as set forth in claim 2 further comprising the step of transferring the series of sections to an appropriate secondary cutting station within a reactor building surrounding the nuclear reactor prior to said subsequent cutting step.

14. A method as set forth in claim 13 wherein said transferring steps include the steps of:
attaching lifting lugs to the section; and
coupling the lifting lugs to a crane.

15. A method as set forth in claim 14 wherein said step of attaching lifting lugs includes the step of attaching the lifting lugs to the vessel prior to said encapsulating step.

16. A method as set forth in claim 14 wherein said step of attaching lifting lugs includes the step of attaching the lifting lugs to the shell prior to said cutting step.

17. A method as set forth in claim 13 wherein said transferring step includes the step of transferring at least some of the sections to a dry cutting station.

18. A method as set forth in claim 13 wherein said transferring step includes the step of transferring at least some sections to a wet cutting station.

19. A method as set forth in either of claims 17 or 18 wherein said subsequent cutting step includes the steps of:
providing a diamond matrix wire;
providing a hydraulic drive apparatus having a drive wheel;
routing the diamond wire so that it envelopes a cutting area of the reactor capsule section;
guiding the wire back to the drive wheel and coupling it thereto; and
rotating the drive wheel so that the diamond wire is pulled through the cutting area of the reactor capsule section.

20. A method as set forth in claim 1 wherein said step of providing sheets includes the step of providing steel sheets and wherein said step of attaching the sheets to the segments includes the step of welding the sheets to the portion of the outer shell.

21. A method as set forth in claim 20 wherein the vessel is cylindrical whereby said segment includes a wall formed from a portion of the vessel which is curved and wherein said sheets are flat.

22. A method as set forth in claim 21 wherein said step of attaching the sheets to the segments includes the step of securing said sheets to each other.

23. A method of decommissioning an nuclear reactor which is situated in a certain operating location and which includes a vessel defining a chamber and reactor internals positioned within said chamber, said method comprising the steps of:
isolating the nuclear reactor;
encapsulating the vessel and reactor internals into a solid reactor capsule while it is in the operating location by forming a matrix within the chamber which integrally attaches to the vessel and integrally embeds the reactor internals to create the solid reactor capsule whereby the capsule will have an outer shell which is formed from the vessel and which substantially encases the matrix and thus the reactor internals; and
converting the reactor capsule into a plurality of decommissioned segments by cutting the reactor capsule into segments which each include a portion of the outer shell and a portion of the matrix and the reactor internals embedded therein whereby each of the segments includes a portion of the reactor vessel and pieces of the reactor internals;
providing sheets which are dimensioned to cover the exposed surfaces of the matrix of the segments; and
attaching the sheets to the segment to cover the exposed surfaces.

24. A method of decommissioning a nuclear device including a receptacle defining a cavity and radiation-exposed internal components positioned within the cavity, said method comprising the steps of:
encapsulating portions of the receptacle and internal components into a solid capsule by forming a matrix within the cavity which integrally attaches to the receptacle and integrally embeds the internal components to create the solid capsule whereby the capsule will have an outer shell which is formed from the receptacle and which substantially encases the matrix and thus the internal components;
converting the capsule into a plurality of segments by cutting the capsule into segments which each include a portion of the outer shell and a portion of the matrix and the internal components embedded therein whereby each of the segments includes a portion of the receptacle and pieces of the internal components;
providing sheets which are dimensioned to cover the exposed surfaces of the matrix of the segments; and
attaching the sheets to the segment to cover the exposed surfaces.

25. A product formed from a decommissioned nuclear reactor which had a vessel defining a chamber and reactor internals situated in the chamber, said product produced by a process which comprises the steps of:
encapsulating portions of the vessel and reactor internals into a solid reactor capsule by forming a matrix within the chamber which integrally attaches to the vessel and integrally embeds the reactor internals to create the solid reactor capsule whereby the capsule will have an outer shell which is formed from the vessel and which substantially encases the matrix and thus the reactor internals; and converting the reactor capsule into a plurality of decommissioned segments by cutting the capsule into segments which each include a portion of the outer shell and a portion of the matrix and the internal components embedded therein whereby each of the segments includes a portion of the receptacle and pieces of the internal components;

providing sheets which are dimensioned to cover the exposed surfaces of the matrix of the segments; and attaching the sheets to the segment to cover the exposed surfaces.

26. A product as set forth in claim 25 wherein said cutting step includes the steps of:

cutting the reactor capsule into a series of sections; and subsequently cutting each of these sections into a plurality of segments.

27. A product as set forth in claim 26 wherein said encapsulating step includes the step of encapsulating all of the reactor internals into the solid reactor capsule.

28. A product as set forth in claim 25 wherein said matrix-forming step comprises the steps of:

providing a fluidized matrix-creating material which may be predictably solidified and which functions as a radioactive shield in its solid state;

introducing the fluidized matrix-creating material into the reactor chamber; and solidifying the matrix-creating material in such a manner that it integrally attaches to the vessel and integrally embeds the reactor internals to form the reactor capsule.

29. A product as set forth in claim 28 wherein said step of providing a fluidized matrix-creating material comprises the step of providing concrete in a fluid form.

30. A product as set forth in claim 29 wherein said step of cutting the reactor capsule includes the step of cutting the reactor capsule into a series of sections which each weigh less than 400 tons.

* * * * *